United States Patent [19]
Kramer

[11] 3,813,021
[45] May 28, 1974

[54] ELECTRONIC SAFETY CONTROL CIRCUIT

[75] Inventor: George C. Kramer, Danbury, Conn.

[73] Assignee: Branson Instruments, Incorporated, Stamford, Conn.

[22] Filed: Nov. 6, 1972

[21] Appl. No.: 304,098

[52] U.S. Cl.................. 228/1, 192/131 R, 228/8, 307/92, 317/135 R
[51] Int. Cl........................................ B23k 27/00
[58] Field of Search................ 317/135 R, 135 A; 192/131 R, 131 H; 228/1, 8; 318/446; 307/92, 142

[56] References Cited
UNITED STATES PATENTS

| | | | |
|---|---|---|---|
| 2,369,243 | 2/1945 | Lechler | 192/131 R |
| 2,452,211 | 10/1948 | Rosenthal | 228/1 |
| 2,675,507 | 4/1954 | Geiger | 192/131 R X |
| 2,962,633 | 11/1960 | Raymond | 317/135 R |
| 3,371,254 | 2/1968 | Hagfors | 317/135 A |

*Primary Examiner*—David L. Trafton
*Attorney, Agent, or Firm*—Ervin B. Steinberg

[57] ABSTRACT

A safety control circuit for operating equipment such as ultrasonic welders and the like is described whereby control is maintained until the equipment operates in a safe condition. A sensor associated with the equipment produces a control signal indicative of the equipment's safe operational condition and is applied to decouple control from initiators used to commence equipment operation. Incidence and coincidence timing networks are employed to require the operator of the equipment to actuate separate palm switches at the same time to initiate equipment operation after which the switches must remain energized until the equipment has achieved the safe operational condition.

3 Claims, 3 Drawing Figures

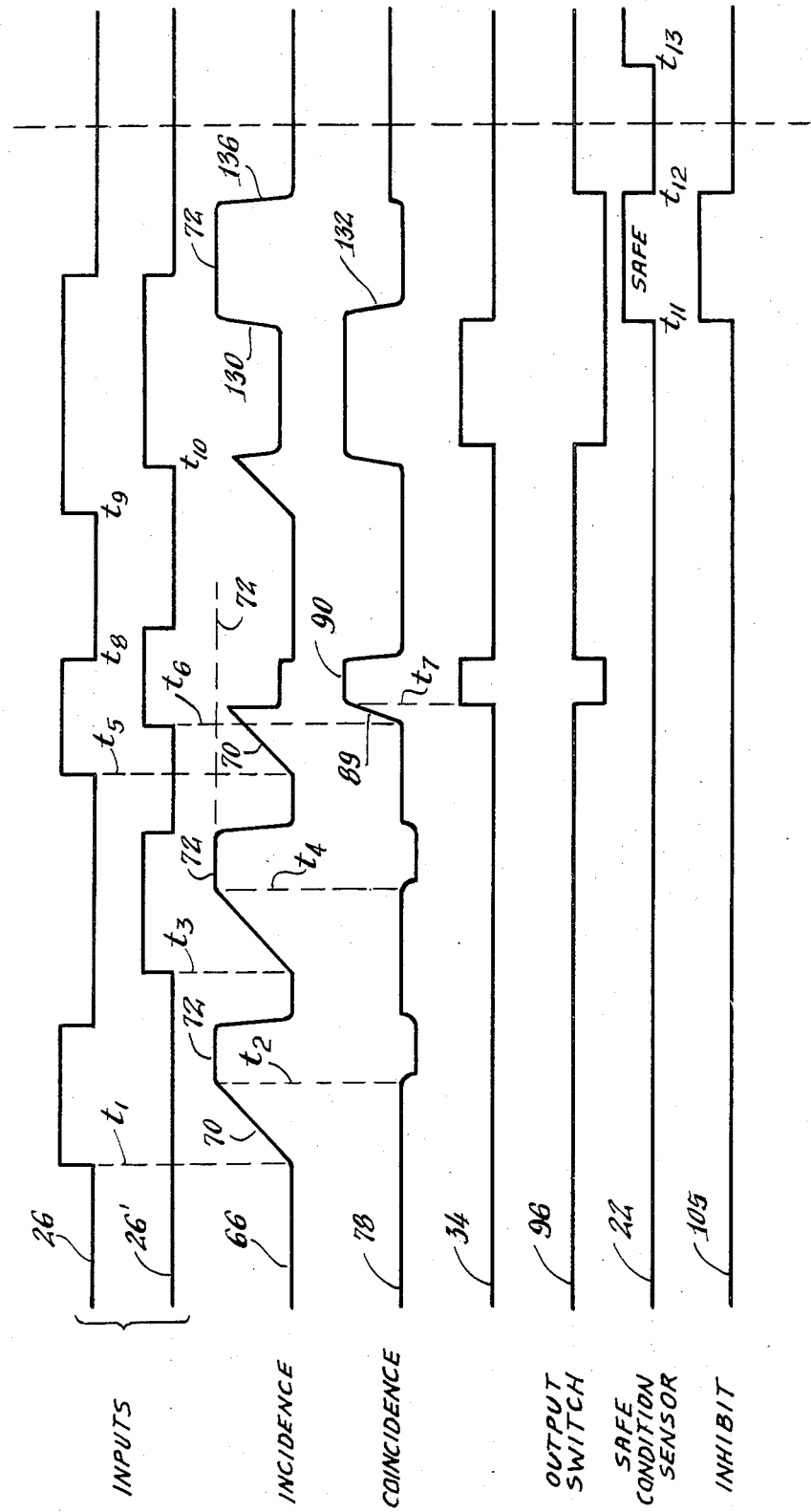

ELECTRONIC SAFETY CONTROL CIRCUIT

This invention relates to a safety control circuit for equipment such as ultrasonic welders, punch presses and the like. More specifically, this invention relates to an electronic safety control circuit to control potentially hazardous equipment until it has entered safe condition.

BACKGROUND OF THE INVENTION

Safety control circuits for electronic ultrasonic welders, punch presses and the like, have been previously described in the art. Note for example U.S. Pat. No. 2,962,633 to Raymond. In this patent a safety network is described wherein a pair of initiators must be energized within a predetermined time of each other before a load can be actuated.

In a co-pending patent application entitled "Electronic Safety Control Circuit" filed by George C. Kramer on Aug. 30, 1971 with Ser. No. 175,927 now U.S. Pat. No. 3,721,833 and owned by the same Assignee as of this invention, an electronic safety control network is described for operating equipment such as an electronic ultrasonic welder in a safe manner. The safety control circuit described in this copending application utilizes electronic OR and AND circuits with timing networks to energize equipment when input signals from initiators controlled by an operator of the equipment occur within a certain time period. With such control, the operators' hands are required at a particular safe location before the equipment can be energized.

SUMMARY OF THE INVENTION

With a safety control circuit in accordance with the invention, the safety circuit maintains control after equipment energization and until a safe condition has been reached. Hence, if the operator releases his control of any one of a number of initiators after equipment operation has begun but before the equipment has reached a safe condition, the circuit interrupts equipment operation.

For example, an ultrasonic welder utilizes a movable head which is brought down upon a workpiece to perform a plastic weld. The head motion is initiated with a pair of palm push-button switches which must be simultaneously or almost simultaneously actuated. If the operator releases his hold on any one of the switches before the head has engaged the workpiece, the ultrasonic welder operation is interrupted. If the operator maintains the switches energized, a safe condition sensor recognizes when a clamping injury of fingers by the moving head can no longer arise. When the head has engaged the workpiece, the safe condition sensor produces a signal to maintain the equipment operating for the remainder of its cycle.

A safety control circuit in accordance with the invention enhances protection of the equipment operator and advantageously extends safety control throughout the potentially hazardous portion of the equipment cycle. It is, therefore, an object of the invention to provide an improved safety control circuit with which operator protection extends through the hazardous operation of the equipment.

BRIEF DESCRIPTION OF DRAWINGS

These and other advantages and objects of the invention will be understood from the following description of a preferred embodiment described in conjunction with the drawings wherein

FIG. 3 is a timing diagram of several of the waveforms generated in the safety control circuit shown in FIG. 2.

DETAILED DESCRIPTION OF EMBODIMENT

Figure 1:
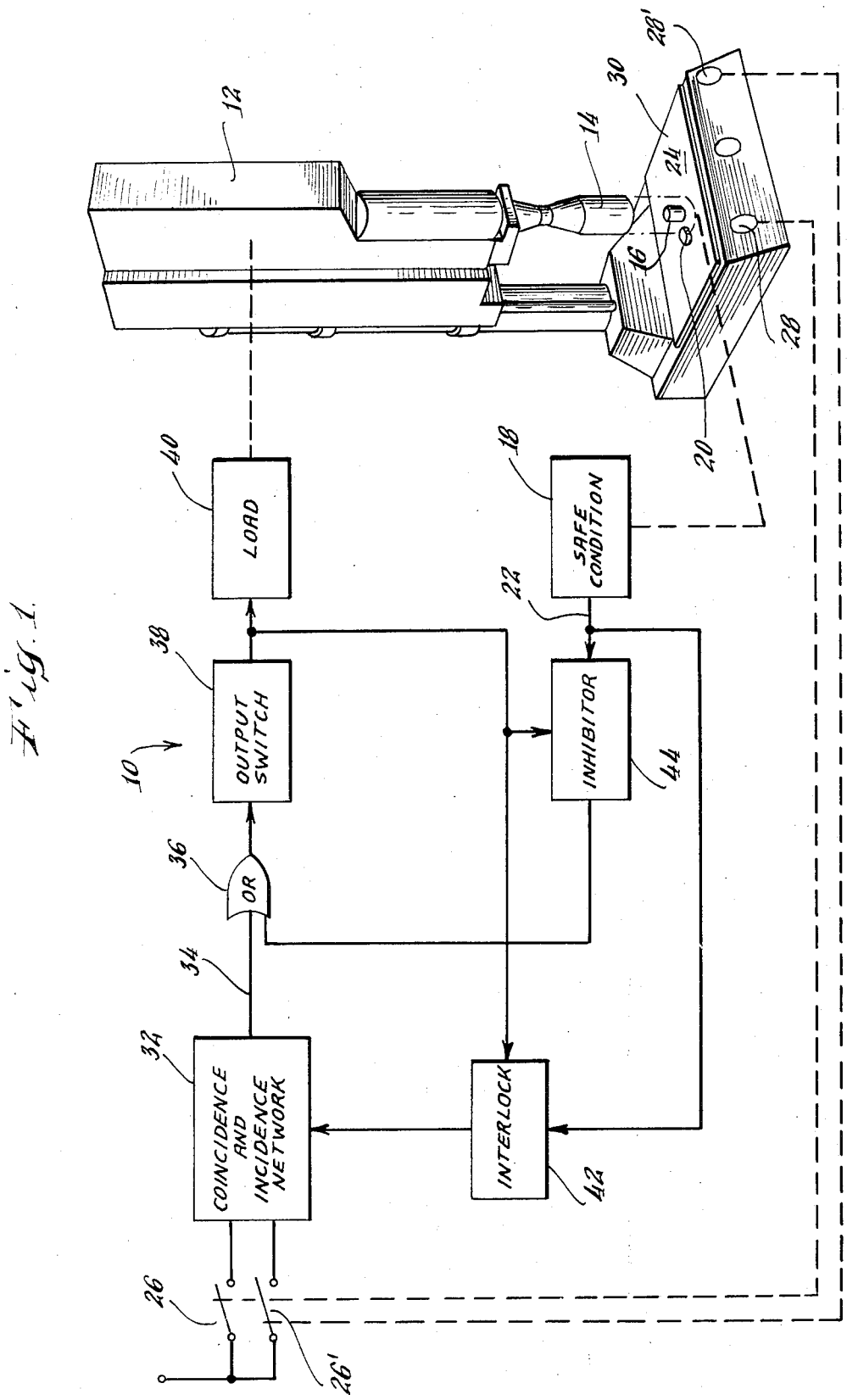
FIG. 1 is a block diagram of a safety control circuit in accordance with the invention and a perspective view of an ultrasonic welder controlled by the circuit.

With reference to FIG. 1, a safety control circuit 10 is shown for controlling operation of equipment such as an ultrasonic welder 12. The welder 12 includes a welding head 14 which is mounted for vertical movement to engage a workpiece 16 to cause a weld or perform other work. A pressure sensitive switch 18 having an actuating element 20 is located to be responsive to the position of head 14. When head 14 is in forced engagement with workpiece 16, as is illustrated at 24 in dotted lines, equipment 12 is considered in a safe condition and switch 18 provides a control signal on line 22 indicative of such safe condition. When head 14 has not activated switch 18, the control signal on line 22 is indicative of an unsafe condition of equipment 12. Operation of ultrasonic welder 12 is initiated with a pair of laterally spaced palm pushbutton switches 26–26' whose pushbuttons 28–28' are shown in front of the working platform 30 away from movable head 14.

Safety circuit 10 includes a coincidence and incidence network 32 such as more specifically described in the previously identified co-pending patent application to sense when input signals from initiator switches 26–26' occur within a preselected time period. When this condition has been satisfied, a load enabling signal is produced on line 34 and passed through an OR gate 36 to close an output switch 38. Output switch 38 is coupled to a load 40 such as the coil of a relay which controls the operation of ultrasonic welder 12.

The output line 22 from safe condition sensor 18 is applied to an interlock network 42 to effectively remove control of safety circuit 10 from input switches 26–26' while enabling continued equipment operation through an inhibitor network 44 and OR gate 36 to maintain output switch 38 closed. When the equipment's cycle of operation is completed, head 14 once again is raised thereby terminating the safe condition signal from sensor 18 and re-arming the safety circuit for the next cycle of operation.

Inhibitor network 44 is rendered operative, i.e. inhibiting signals on line 22 from operating output switch 38, during such times when output switch 38 is open. This prevents energizing of load 40 and welder 12 by accidental actuation of safe condition sensor 18.

Figure 2:
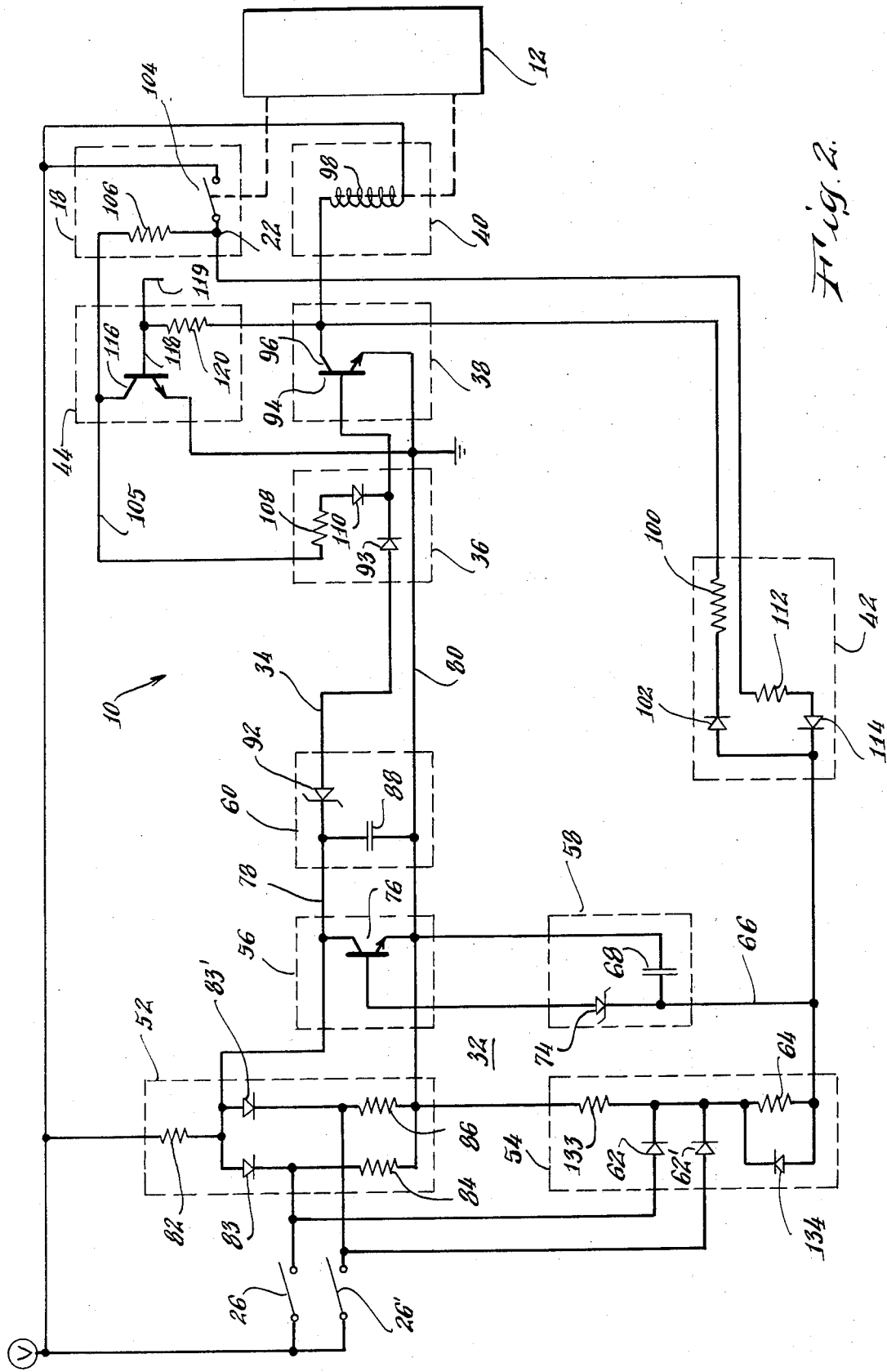
FIG. 2 is a schematic of an electronic safety control circuit in accordance with the invention.

With reference to FIG. 2, a safety control circuit 10 in accordance with the invention is shown with schematic details. Circuit 10 includes a network 32 formed of a coincidence detector 52, an incidence detector 54, an inhibitor 56, an incidence timer 58 and a coincidence timer 60.

Network 32 is substantially similar to that described in the previously identified patent application and operates as follows. When the operator activates only palm switch 26 at time $t_1$ (see FIG. 3), current from positive voltage source V flows through diode 62 and resistor 64 to junction 66 to commence charging capacitor 68 as shown by ramp 70 on waveform 66 in FIG. 3. When the voltage of junction 66 reaches the breakdown level 72 for zener diode 74 at time $t_2$, current flows into the base of transistor 76 which begins to conduct. Conduction of transistor 76 effectively clamps junction 78 close to the potential of ground line 80 and thus inhibits actuation of coincidence timer 60. A similar inhibiting action arises when switch 26' only is actuated at time $t_3$ with the clamping of junction 78 occurring at time $t_4$.

The incidence timer network 58 thus requires that both initiators 26–26' be actuated within the time periods of $t_1 - t_2$ or $t_3 - t_4$, which time periods are equal and are determined by the time constant formed by resistor 64 and capacitor 68.

When initiators 26–26' are activated in close timing relationship such as respectively at $t_5$ and $t_6$, current, which is normally bypassed from resistor 82 through either diodes 83–83' and either resistor 84, 86, is permitted to quickly charge capacitor 88 as shown with ramp 89. When at time $t_7$ the capacitor voltage or voltage of junction 78 attains level 90 where zener diode 92 breaks down, current flows through diode 92 in OR gate 36 to activate transistor 94 in output switch 38.

The activation of output switch 38 is accompanied by rendering transistor 94 conductive. Since the collector 96 of transistor 94 is connected through coil 98 of relay-load 40 to voltage source V, a substantial current flows through transistor 94. The latter current is sufficient to energize relay-load 40 and commence operation of equipment 12.

Collector 96 is coupled to junction 66 through resistor 100 and a diode 102 which both form part of interlock network 42. When transistor 94 is rendered conductive, the collector voltage drops from a high voltage to close to ground potential as shown with waveform 96 in FIG. 3 at time $t_7$. The low voltage of collector 96 draws current away from junction 66 thereby preventing capacitor 68 of being charged to level 72.

With equipment 12 operating, head 14 (see FIG. 1) for example, is advancing towards workpiece 16. If the operator releases initiator switch 26 at time $t_8$ (see FIG. 3) and before equipment 12 has reached a safe condition, junction 78 drops below the conduction potential level 90 for zener diode 92 by virtue of the quick discharge of capacitor 88 through diode 83. As a result, the enabling signal for output switch 38 and thus equipment 12 is terminated.

Collector 96 of output switch 38 is connected through relay coil 98 to voltage source V. Energization of relay coil 40 operates switches (not shown) in equipment 12 to commence its operation such as the downward movement of ultrasonic welding head 14 in FIG. 1. When equipment 12 has reached a safe position, the normally open safe condition sensing switch 104 is closed. Closure of switch 104 produces an enabling signal on line 22 and, through resistor 106, on line 105 from voltage source V. The enabling signal on line 105 is delivered through resistor 108 and diode 110 in OR gate 36 to activate output switch 38 and maintain equipment 12 operating independent from the status of input signals from initiators 26–26'.

Closure of safe condition sensing switch 104 further delivers an interlock signal to interlock network 42 through resistor 112 and diode 114. The interlock signal produces a fast charge of capacitor 68 to the breakdown level for zener diode 74 to thus render transistor 76 conductive and effectively decouple input signals from output switch 38.

During "off" conditions of safety circuit 10, inhibitor network 44 prevents equipment 12 from being energized by an accidental closure of safe condition sensing switch 104. Network 44 is formed of a transistor 116 having its base 118 coupled through a resistor 120 to collector 96 of output switch 38. The collector and emitter of transistor 116 are respectively coupled to line 105 and ground return 80. When output switch 38 is open and collector 96 essentially carries the potential of source V by means of the electrical connection through coil 98, transistor 116 conducts. Conduction of transistor 116 effectively shortcircuits line 105 and thus inhibits the effect of accidental closures of safe condition sensing switch 104. The current drawn through resistor 120 and base 118 is sufficiently small to prevent actuation of relay-load 40.

The operation of safe condition sending switch 104 may be more particularly explained with reference to the waveforms in FIG. 3 and the circuit in FIG. 2. The actuation of initiators 26–26' in close timing sequence at $t_9$ and $t_{10}$ results in the enabling of output switch 38 with collector 96 dropping close to ground potential in the manner as was previously described with reference to the events at times $t_5$ through $t_7$.

With output transistor 94 conducting, a substantial current is drawn through the coil of relay-load 40 causing equipment 12 to operate. At some time later, $t_{11}$, with both initiators 26–26' remaining in the actuated state, safe condition sensing switch 104 is closed. Closure of switch 104 results in an enabling signal on line 105 to keep transistor output switch 38 conducting. At the same time, current is delivered through resistor 112 and diode 114 to charge incidence timing capacitor 68 as indicated by wave shape 130 in FIG. 3. Capacitor 68 is quickly charged to level 72 where zener diode 74 conducts causing transistor 76 to conduct and discharge coincidence timing capacitor 88 as shown with wave shape 132.

With capacitor 88 discharged, the current drive for enabling output switch 38 is transferred to the current flowing through line 105. This current is maintained until equipment 12 has completed its function and its operating cycle re-opens safe-condition sensing switch 104 at time $t_{12}$ such as when head 14 (see FIG. 1) moves away from workpiece 16.

In the normal sequence of operation, equipment 12 completes its function by supplying a current input on line 119 into base 118 of transistor 116. This renders transistor 116 conductive and shunts the enabling signal on line 105 to ground. Output switch 38 is thus deprived from current drive allowing transistor 94 to become non-conductive and de-energizing relay-load 40. With relay-load 40 de-energized, head 14 is caused to retract (see FIG. 1) from workpiece 16 to reopen safe-condition sensing switch 104 at time $t_{12}$.

Opening of safe condition sensing switch at time $t_{12}$ allows the voltage on collector 96 to rise to render inhibitor transistor 116 conductive and effectively reverse-bias diode 102.

A repeat cycle may be initiated by first rendering both initiators 26–26' inactive. This permits the charge which had been previously placed on incidence timing capacitor 68 from safe condition sensor 18, to dissipate to ground line 80 through resistor 133 and a diode 134 connected in parallel with the relatively large incidence timing resistor 64. This discharge of capacitor 68 occurs rapidly as shown by waveshape 136 to quickly reset initial circuit conditions for a repeat cycle of operation.

In the event the operator continued to activate either one of the initiators 26 or 26' after safe condition sensor switch 104 had reopened, capacitor 68 would not discharge. Instead, current would continue to be delivered through incidence timing resistor 64 and zener diode 74 to transistor 76 and thus prevent circuit 10 from being re-cycled. However, as soon as both initiators 26-26' are released, equipment 12 can again be operated through the normal safety steps imposed by circuit 10.

In the event the safe condition sensing switch 104 is inadvertently closed as at time $t_{13}$, no enabling of output switch 38 occurs since inhibitor 44 prevents line 105 from delivering current to output switch 38. Also, an interlock signal is delivered to interlock network 42 through resistor 112 and diode 114 producing a rapid charge of capacitor 68 to the breakdown level for zener diode 74, thus rendering transistor 76 conductive and effectively decoupling initiators 26-26' from output switch 38. Therefore, operation of equipment 12 can only be initiated when safe-condition sensing switch is open and after initiators 26-26' are released. This prevents operation of equipment 12 if safe-condition switch 104 is permanently closed or shortened.

The voltages and components selected for safety circuit 10 may vary depending upon the switching components employed. In a safety circuit 10 built to provide the safety features of this invention, a voltage source of +20 volts was used. Resistor 100 was so sized, about 180 k ohms, that capacitor 68 could still be charged through resistor 112 (about 30 k ohms) and diode 114 when safe condition sensing switch 104 was closed. Other component values were resistors 84, 86 and 133 each 47k; resistor 82, 750 k; and resistor 64, 3.3 M ohms.

Having thus described a safety circuit in accordance with the invention, its many advantages may be appreciated. Operator release of equipment controls before the equipment is in a safe operational condition causes immediate return of the equipment into a safe condition. Several safe condition detectors may be used and their control of the equipment assures enhanced protection of the operator.

What is claimed is:

1. A safety control circuit for operating an ultrasonic welder having a welding head arranged to operate from a safe starting position through an unsafe travel range to a safe final operating position in which said head engages a work piece comprising:

means for producing an input signal to initiate the advance of the ultrasonic welding head from the safe starting position towards the final operating position;

means controlled by the input signal for producing an equipment enabling signal to control operation of the equipment throughout the unsafe travel range and to the safe final operating position of the welding head;

a sensing element disposed for being responsive to the engagement between said welding head and work piece to produce a control signal respectively indicative of the absence and arrival of the ultrasonic welding head at its safe operating position;

means responsive to the control signal from the sensing element and the input signal from the initiating means to cause a termination of the travel of the ultrasonic welding head and its return to said safe starting position when said input signal fails during the travel of the welding head through its unsafe range and to latch the equipment enabling signal when the welding head has reached its final safe operating position without said failure of the input signal.

2. The safety control circuit as claimed in claim 1 wherein the sensing element is formed of a pressure sensitive element.

3. The safety control circuit as claimed in claim 2 wherein the pressure sensitive element is formed of a stationary electrical switch having an actuating element which is actuated responsive to the engagement force between said welding head and the work piece.

* * * * *